F. K. FASSETT.
CASH REGISTER.
APPLICATION FILED JUNE 8, 1906.

965,509.

Patented July 26, 1910.
7 SHEETS—SHEET 6.

Witnesses

Inventor
Francis K. Fassett
by J. B. Hayward
and R. C. Glass
Attorneys

UNITED STATES PATENT OFFICE.

FRANCIS K. FASSETT, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER.

965,509.  Specification of Letters Patent.  Patented July 26, 1910.

Application filed June 8, 1906. Serial No. 320,756.

*To all whom it may concern:*

Be it known that I, FRANCIS K. FASSETT, a citizen of the United States, residing at Dayton, in the county of Montgomery and State of Ohio, have invented certain new and useful Improvements in Cash-Registers, of which I declare the following to be a full, clear, and exact description.

This invention relates to cash registers, and has for its object to provide an improved indicating or announcing mechanism to be used in connection therewith. Attempts have been made prior to this invention to apply a phonograph for use in connection with a cash register to announce the amounts of purchases, which were also indicated by the machine. These prior devices, however, have been such that no true commercial indication, so to speak, has been obtained. By that is meant that either only one phonograph cylinder was used, or if a plurality of cylinders were used for different denominations, the announcement made would not be in such shape as was desirable. For example, if a machine be devised with one phonograph cylinder for each denomination, it is evident that all operations of the machine will not necessitate the use of all the cylinders. A sale of one dollar, for example, would not call for the use of either the dime or the penny cylinder. Moreover, if a sale of twenty cents, for example, was made, the word "cents" should follow the amount, but if, on the other hand, the sale was, say, twenty-two cents, the word "cents" should not come after the word "twenty," but after the word "two;" so also it is evident that a one-cent purchase should be so announced, but if the purchase is thirty-one cents, the word "cents" should be pluralized. These defects and others have been present in prior solutions of this problem, and it is intended to improve on such constructions and to provide a machine which will announce a purchase in the exact manner which would be followed by a person speaking.

As shown this invention is applied to a well-known type of cash register, shown, for example, in Patent No. 497,860, to Thomas Carney, but it will be evident that the invention is not limited to use with this or any other particular style of cash register, but may be used with any machine on the market. In fact, it may be used with machines which do not come under the technical title of cash register, that is, machines which may only indicate or only record the amounts of purchases.

With these and incidental objects in view, the invention consists in certain novel features of construction and combinations of parts, the essential elements of which are set forth in appended claims and a preferred form of embodiment of which is hereinafter specifically described with reference to the drawings which accompany and form part of this specification.

Of said drawings.

This invention broadly comprises a plurality of phonograph cylinders, one for each denomination, adapted to be controlled by the cash keys, and having a spring or other motor for rotating the cylinders. A series of reproducers, one for each cylinder, is employed, and means are provided for permitting them to engage the cylinders successively to prevent the confusion of sounds. In cases where some one cylinder is not to be used, as would be the case, for example, when there was a sale of one dollar and four cents, in which case the dime cylinder would remain out of use, means are provided for preventing the interval between the operation of the dollar cylinder and the cents cylinder, which would normally occur, and the same is true of the other banks. Means are also provided for locking the phonograph cylinder until the operating devices of the machine finish their movement, and for winding the motor for the phonograph cylinders at each operation of the machine.

Figure 1:
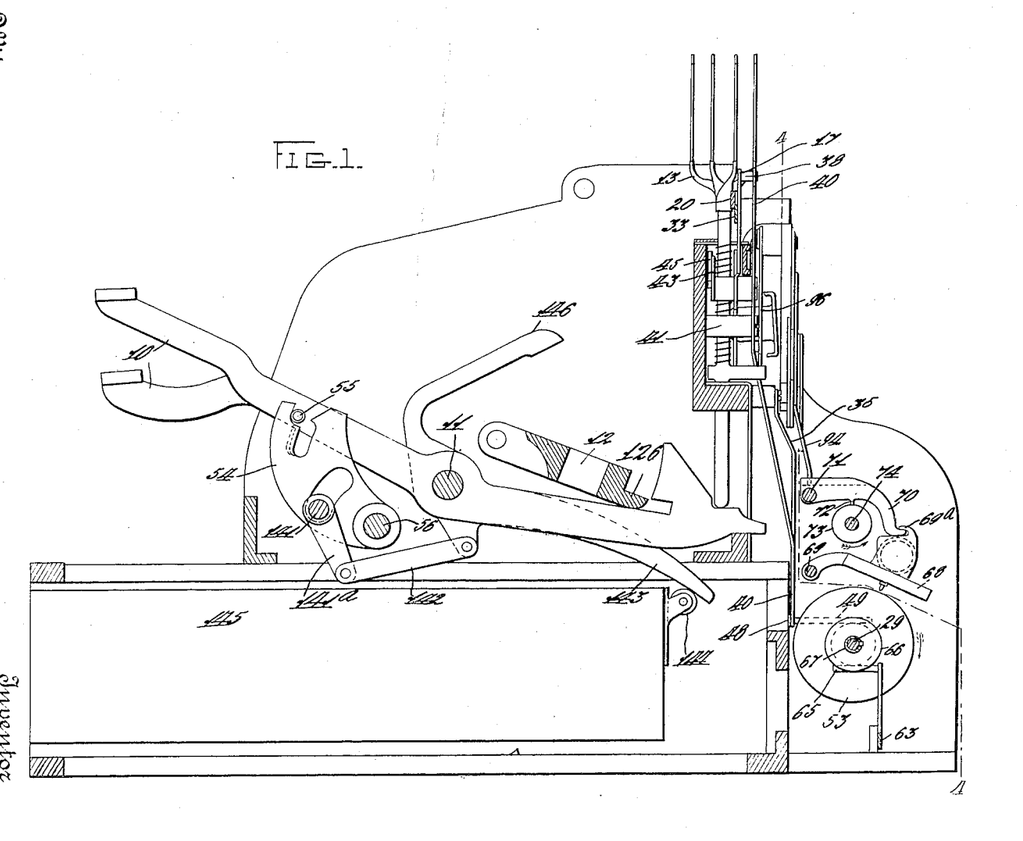
Figure 1 is a transverse section through the machine.

Described in general terms, the machine may be said to comprise, as shown in Fig. 1, a series of keys 10, journaled on a transverse shaft 11, and coöperating with a key coupler 12. Each of the keys is adapted to operate an indicator 13 by a connection from the rear end of said key to the indicator stem. It will be readily understood that the operation of the keys causes an actuation of the counter, or of recording devices, or both, and such means are shown in the patent to Carney referred to, and form no part of my present invention.

Figure 4:
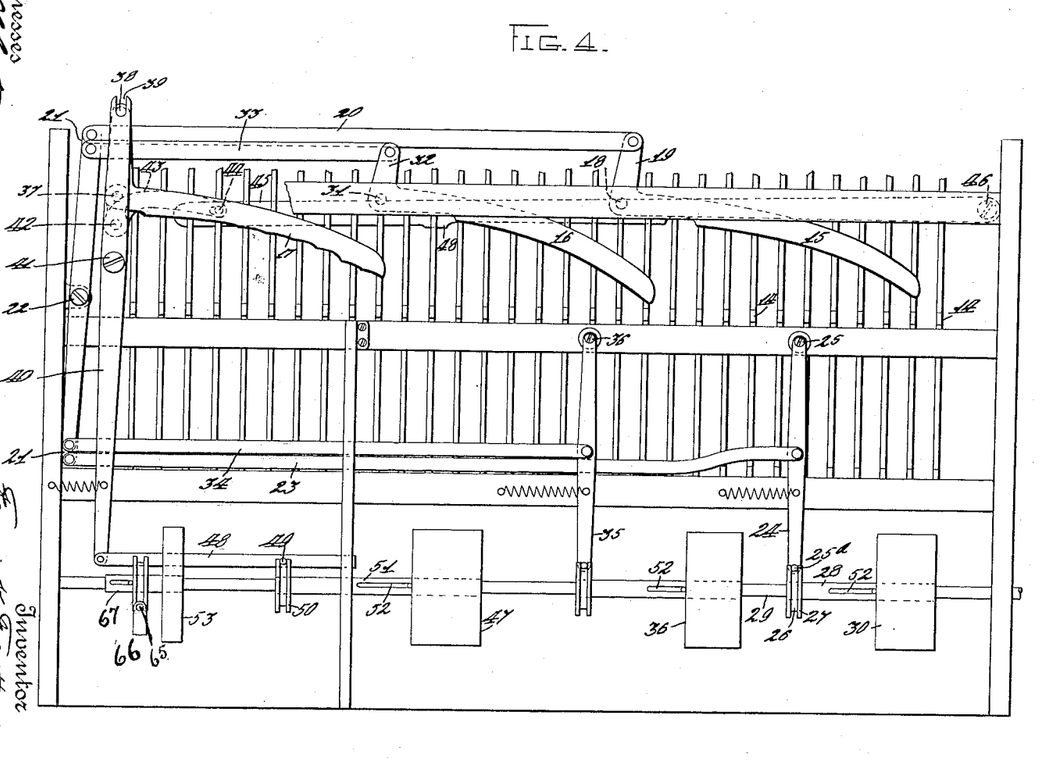
Fig. 4 is a section looking from the rear of the machine, the line of section being indicated on Fig. 1 by the line 4—4.
Figure 5:
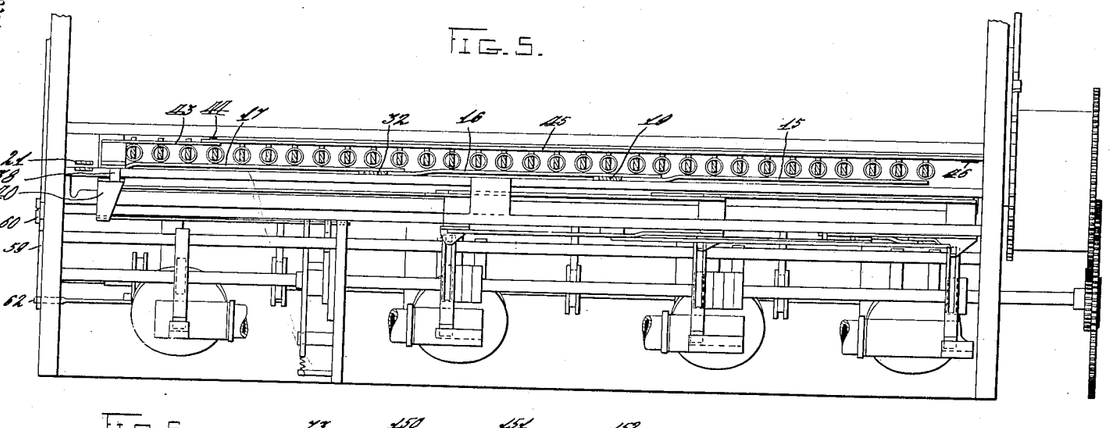
Fig. 5 is a top view of the cylinders and associated parts.

Referring now to Fig. 4, it may be said that this figure shows the devices for setting the various phonograph cylinders from the keys. In this embodiment of the invention, the records are circularly arranged on the surface of the usual phonograph cylinder, and means are provided for adjusting the cylinder axially to bring any desired record into position to be engaged by its reproducer. The rotation of the cylinder then causes the reproduction of the desired words. The keys are adapted to move the cylinders axially, and for this purpose the indicator corresponding to each key is provided with a lug 14, adapted when raised to engage one of a series of levers, 15, 16 or 17, as shown in this figure. Lever 15 is controlled by the dollar bank of keys, and is mounted on a pin 18 on the frame of the machine, and has integral therewith a short arm 19 connected by means of a link 20 to a lever 21, pivoted on a pin 22, which lever 21 has connected to it a second link 23, operating a lever 24, pivoted at 25 on the main frame. This lever 24 has at the lower end a pin 25ª in a circular groove 26 in a disk 27, mounted on a sleeve 28 on shaft 29. This shaft 29 is the supporting shaft for all the phonograph cylinders, and they are all rigidly mounted on sleeves of said shaft. Sleeve 28, previously referred to, supports record cylinder 30 for the dollars bank. It will be evident from the previous description that an operation of any key in the dollar bank will cause movement of lever 15 around its pivot 18, and the result of this will be that cylinder 30 will be slid on its shaft 29 a distance depending on the key depressed. This movement will bring its proper record into alinement with the stylus for this cylinder.

Lever 16 is adapted to be moved by any key of the dime bank, except the ten-cent key, and is a bell-crank lever, being pivoted on pin 31, and having a short arm 32 connected by a link 33, to a lever also pivoted on pin 22, which is precisely in front of lever 21 shown in this figure. The said lever is connected at its lower end to a link 34, and this link is pivoted to a lever 35 mounted on pin 36 of the main frame, and carries at its lower end a pin engaging a circular groove in a sleeve in a manner precisely similar to that previously described with respect to the dollar cylinder. This dime cylinder indicated by 36 has thereon records from twenty cents to ninety cents. No record for ten cents is made on this cylinder, the ten cent record being placed on a wide cylinder shown in this figure, which is also adapted to announce penny sales. The mechanism for operating this penny cylinder is different from the mechanism previously described with respect to the dollar and the dime cylinder, both on account of the ten-cent indication being placed thereon, and for the reason that it is sometimes necessary to enunciate "one cent," and sometimes "one cents." It will also be evident that to provide for enunciating amounts from eleven cents to nineteen cents, some additional means must be provided. To accomplish this result two mechanisms are provided, either of which is adapted to produce movement of the penny cylinder independently of the other, and whether the other is operated therewith or not. That is to say, either mechanism controlled by the ten-cent key may be operated, or the mechanism controlled by the penny keys may be operated, or both may be operated together, and in the last case the movement will be made up of that due to each of the prior movements. This mechanism is shown in Fig. 4, and comprises a bell-crank lever 17, pivoted at 37, and the short arm of which has a pin 38 adapted to ride in a slot 39 on a lever 40, which lever is pivoted on a pin 41 of the main frame. The pivot 37 for lever 17 is not a stationary pivot on the main frame, as is the case with pins 18 and 31 for the dollars and dimes levers respectively, but is mounted on a swinging-bar pivoted at 42 to the main frame. This bar carries an arm 43, indicated in dotted lines in this figure, and the said bar has at its right-hand end a pin 44 moving in an elongated slot in a long lever 45. This lever 45 is pivoted on a pin 46 at the extreme right of the figure, and is adapted to be rotated slightly around said pivot by any key in the dime bank.

The indicator lugs 14 of the keys from two to nine cents inclusive and from twenty to ninety cents inclusive at the upper ends of their stroke will strike the under side of lever 45 and slightly rock it around its pivot to a constant amount. The lugs mentioned do it is true strike the lever at different distances from its pivot but this is compensated for by the amount of lost motion given the said lugs before the lever is struck due to the angle of said lever. It is also true that alining devices which are generally used in this art will serve to take up a slight amount of incorrectness of setting. Rocking the lever 45 will raise the pin 44 and thereby rock lever 43 around its pivot 42 in consequence swinging the pivot 37 for lever 17 to the left in Fig. 4. It will be evident that this construction fulfils the object stated, that is it serves to move the phonographic cylinder a distance not only depending on the penny key depressed but also on any dime key operated in correspondence with any penny key. If keys from two to nine cents are operated alone, lever 17 will be rocked around its pivot 37 thereby causing lever 40 to rock around its pivot 41 to move the penny cylinder 47 a distance depending on the key depressed. If, however, a key from twenty to ninety cents is operated the lever 45 will be rocked around its pivot 46 and thereby carry pivot 37 to the left which causes a bodily movement of lever 17 to the left resulting in a constant movement of the phonographic cylinder 47 even if no penny key is depressed. If a key in each bank is used the movements described will both occur and the cylinder will be moved a greater distance than if only one bank of keys was employed.

The ten cent key is designed to move the cylinder 47 a greater distance than the other dime keys and this is accomplished by providing a projection 48 on the under side of lever 45. The lug 14 for the ten cent key will strike the projection 48 and throw lever 44 to a greater extent than will be the case when any other key in the dime bank is depressed. The one cent key is arranged to rock lever 17 only and not to cause movement of the lever 43 as will readily be seen from an inspection of Fig. 4. The "No sale" record is on the penny cylinder and is normally in position to register with the reproducing stylus. The "No sale" key is at the extreme left as viewed in Fig. 4 and lever 17 is provided with a cut away portion in the path of the lug 14 for this key so that no motion of lever 17 will be produced when the "No sale" key is depressed.

To make clear the arrangement of the records in the penny cylinder it may be assumed that the one cent key moves the cylinder a distance equal to 2X and that the keys of the dime bank except the ten cent key also produce a motion equal to 2X, but that the ten cent key through projection 48 produces a motion equal to 3X. With this assumption it will be seen that if the one cent key is depressed alone lever 17 will be rocked causing a motion of 2X to be given the cylinder. If the ten cent key is operated alone a motion of 3X will be given the cylinder through lever 45. If a dime bank key from twenty to ninety cents is operated in conjunction with the one cent key the cylinder will receive a 4X extent of motion, 2X of this being caused by the penny key and 2X by the key of the dime bank. If instead of a twenty or ninety cent key the ten cent key is operated with the one cent key, a motion of 5X, 2X due to the one cent key and 3X to the dime key will be given the cylinder. If the two cent key is operated the cylinder 47 will be given a 2X movement through lever 45 and a 4X movement through lever 17, this being twice the movement produced by the one cent key thereby causing a total movement of 6X to be given the cylinder. If instead of a twenty to ninety cent key the ten ¢ key is operated in conjunction with the two cent key an additional X movement will be given the cylinder making a total of 7X of movement for twelve cents. By carrying out operations similar to those indicated above it will be seen that the records on the penny cylinder will in order be as follows: no sale, one cent, ten cents, one cents, eleven cents, two cents, twelve cents, and so on up to nineteen cents. It will be seen that with this construction if a key from twenty to ninety cents is operated without any penny key the penny cylinder will be set for one cent, that is it will be moved a 2X distance but in this case the stylus is prevented from engaging the penny cylinder as will be more fully explained hereafter.

Figure 3:
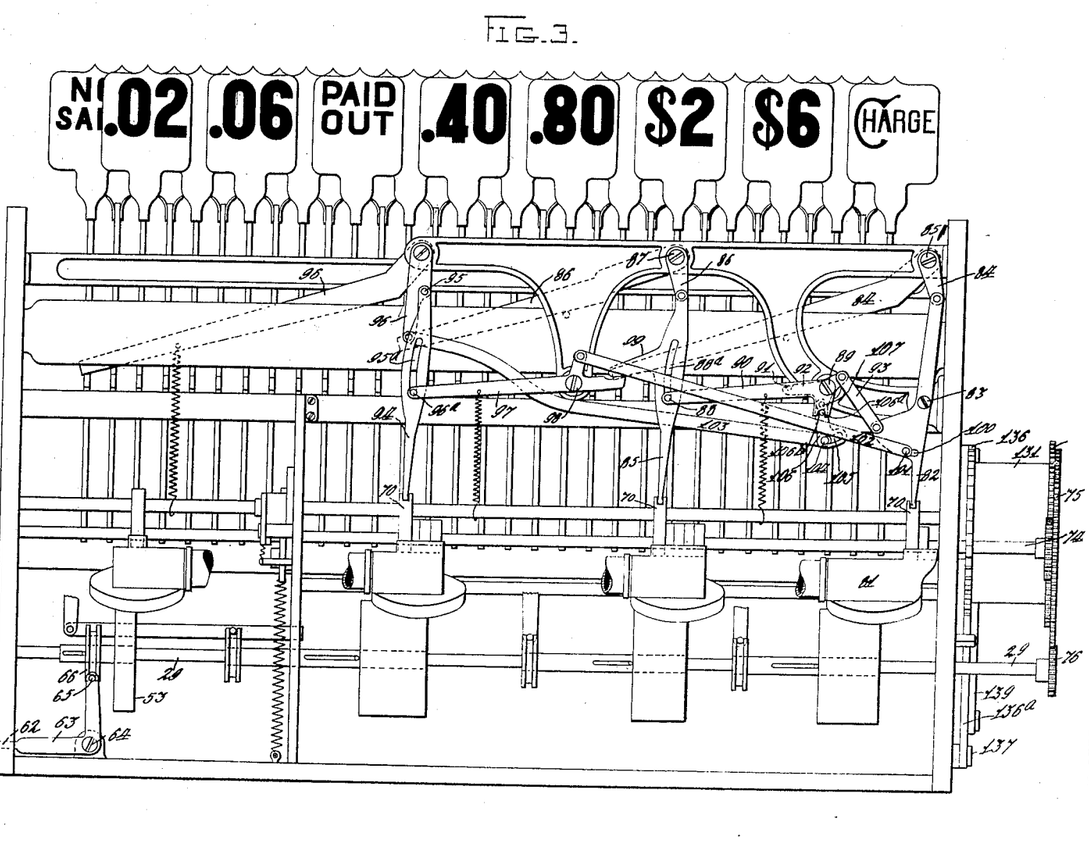
Fig. 3 is a rear elevation of the machine.
Figure 6:
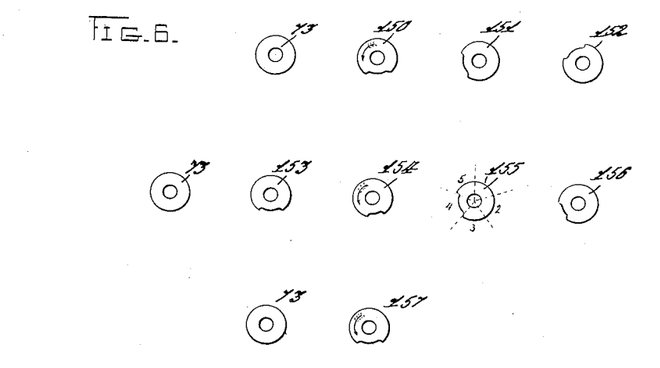
Fig. 6 is a diagram of the controlling cams for the reproducing styli.
Figure 10:
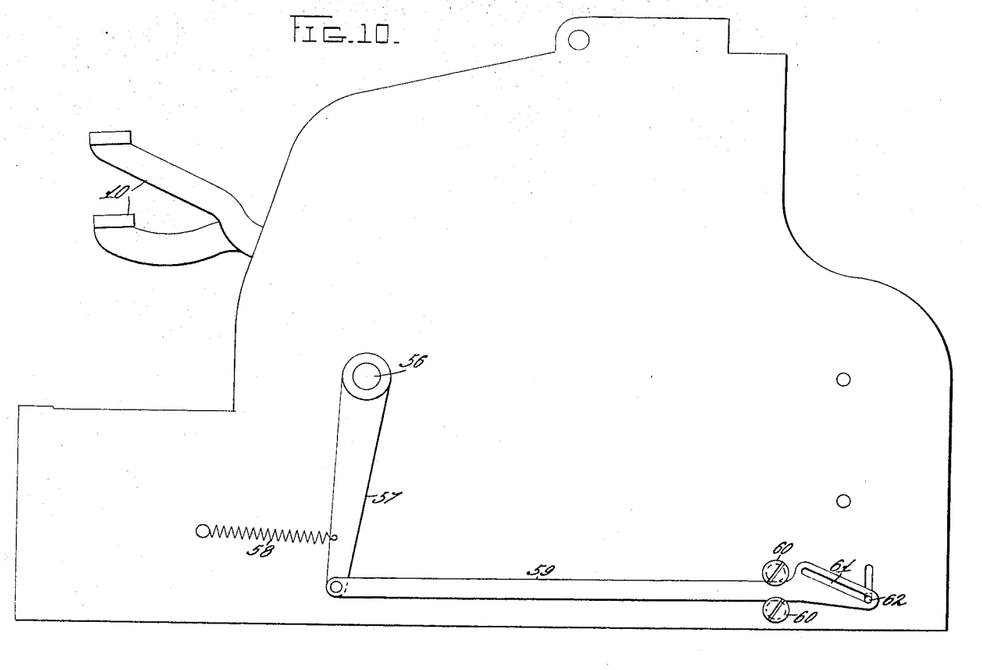
Fig. 10 is a side view of the machine with parts broken away, showing the setting device for the special transaction cylinder.

It may be noted that movement of cylinder 47 is obtained in a manner similar to that of the dollar and dime cylinders, by connecting lever 40 with a link 48, which similarly bears a pin 49, engaging in a circular slot in a disk 50, carried by a sleeve 51 on the motor shaft 29. These sleeves are all splined to the said shaft 29, as indicated at 52 in connection with the dime cylinder, so that they may be slid longitudinally, but will be compelled to rotate with said shaft. At the left of Fig. 4 is shown a cylinder 53, which is intended for use in connection with what are termed "special transaction indications." Keys for "Paid out," "Received on account" and "Charge," are used and these keys are adapted to set the said cylinder 53 for reproduction. This setting movement is caused by differential cams 54, shown in Fig. 1, which are adapted to be engaged by anti-friction rollers 55 carried by said special keys, so that when said keys are depressed the cam device 54 is differentially rocked around its pivot on a shaft 56. This shaft 56, as shown in Fig. 10, has mounted at one end thereof a lever 57, normally spring-drawn to the left by a spring 58, and said lever has connected thereto a link 59. This link is guided at the rear end thereof between two rollers 60, and has a cam slot 61 in which a pin 62 is adapted to ride. This pin 62, as shown in Fig. 3, is a part of a bell-crank lever 63, pivoted on a pin 64, and similarly to the levers shown on Fig. 4 is provided with a pin 65 adapted to engage in a circular groove in a disk 66 on a sleeve 67, which sleeve is mounted on shaft 29, and carries the special transaction cylinder 53. It will be evident from the above description that when one of the special keys is operated the cylinder 53 will be slid longitudinally a distance depending on the key depressed, and will therefore bring into operative relation with the reproducing stylus for this cylinder the corresponding indication. After the cylinders have been set to the desired positions in the manner previously described, the styli are permitted to engage the records and perform their function of reproducing the amount recorded on the said cylinder. In Fig. 1 is shown a reproducer 68, mounted on a rod 69, and it will be understood that there is one such reproducer for each cylinder in the machine. The reproducers are normally supported out of operative relation with the cylinder by means of a lug 69$^a$ integral with the reproducer, and which is adapted to be engaged and supported by a lever 70 pivoted on a rod 71. This lever has on the under side a projection 72, adapted to engage a disk 73 on a shaft 74. This disk is in the normal position of the parts directly under the projection 72, and so holds the stylus permanently out of contact with the phonograph cylinder, and it will be understood that there is one such disk and lever 70 for each reproducer. Beside disk 73, and also rigidly mounted on the shaft 74, are cams of which there are at least one for each reproducer. These cams are shown in diagram in Fig. 6, and it will there be seen that the penny reproducer has three cams, 150, 151 and 152, spaced around shaft 74 in addition to its smooth disk 73. The dime reproducer has four cams, 153, 154, 155 and 156, also spaced around the shaft, and two of which are, as shown, broken away, in addition to its smooth disk. The dollar reproducer has one cam 157 and a smooth disk, as indicated in Fig. 6. The necessity for these cams follows from the fact that in all transactions with the machine it is not desired to cause an operation of all of the phonograph cylinders. For example, if a sale of twenty cents was made, no announcement from either the dollar cylinder or the penny cylinder would be required, but if instead of the smooth disks and plurality of cams only one cam was provided for each cylinder, the reproducers would all be allowed to drop into contact with the cylinders at each operation and some announcement would be made, or at least a scratching noise of some kind, which is undesirable.

By providing, however, the smooth disks it is possible to retain any desired reproducer out of contact with its cylinder when no amount on that particular bank of keys has been registered.

The plurality of cams shown in connection with the dime reproducer are adapted to prevent an interval between the announcement of amounts. For example, if a sale of $1.04 was to be announced, even if means were provided for retaining the dime reproducer out of contact, there would still be an interval between the announcement of the dollar and penny amounts because of the rigid positioning of the cams on the shaft. Means are provided for shifting the levers 70 laterally, dependent on the combinations of banks of keys used, and when so shifted laterally they are in register with cams on the shaft 74, which prevent the interval between announcements before referred to. Further, in some cases it is desired to announce the word "cents" after a dime announcement where no penny key has been depressed, while in cases in which a dime and a penny key are both depressed the words "cents" should not be announced after the dime amount. This is provided for by cutting away some of the cams for the dimes bank, as shown in Fig. 6, so that the reproducer for the dime cylinder will be raised before the word "cents" has been enunciated.

The means for shifting the levers 70 laterally are shown in Fig. 3, and will now be described. Referring first to Fig. 6 it will be seen that the penny reproducer is provided with three cams, 150, 151 and 152, each having a cut-away portion, and the cut-away portions being successively arranged around the shaft. The shaft 74 on which these cams are mounted is arranged to be given one complete rotation at each operation of the device, and a gear 75, shown in Fig. 8, mounted on this shaft, is adapted to engage a pinion 76, mounted on the cylinder shaft 29, the ratio of gearing being five to one, so that the cylinders are given five complete rotations at each operation. The first rotation is free, and is simply for the purpose of allowing a sufficient speed to be attained. During the second rotation the special transaction cam 158 shown in Fig. 6 will be at the top of its rotation and will allow its stylus to drop into contact with the special transaction cylinder. The cam 157 for the dollar stylus is arranged two-fifths of a revolution from the top, so that during the third rotation of cylinder-shaft 29 the dollar stylus will be allowed to drop into contact with its cylinder. The dime reproducer is provided with four cams, 153, 154, 155 and 156, of which cams 153 and 155 have a depressed portion equal to one-fifth of a revolution, and cams 154 and 156 have the cut-away portion shortened. As shown in Fig. 6, the first cam 153 is in the position of the dollar cam and will be brought into operation at the third revolution of cylinder shaft 29. The next dime cam 154 will bring the stylus into connection at the same time as the first cam, but will raise it before the word "cents" has been enunciated. The third dime cam 155 is arranged one-fifth of a rotation farther around the shaft, so that it will not allow the stylus to drop into contact with the cylinder until the fourth rotation of said cylinder. The last dime cam 156 is adapted to permit contact of the stylus and cylinder during the fourth rotation, but like the second cam is shortened to raise the stylus before the word "cents" has been enunciated. The cents reproducer is provided with three cams, 150, 151 and 152, as shown in Fig. 6, having cut-away portions successively arranged to allow the stylus to drop into contact with the cylinder during the third, or fourth, or fifth rotation of the said cylinder.

Referring now to Fig. 3, separate reproducers are shown in this figure, and the usual tube leading therefrom is shown as broken away. At the right of this figure is the dollar reproducer, indicated by the numeral 81. The support 70 previously referred to has engaging therewith a lever 82, pivoted at 83 on the main frame. This lever is connected at its upper end to a bell-crank lever 84, pivoted on a pin 851. This lever 84 is adapted to be engaged and elevated by any of the dollar keys, and it is evident that when such elevation takes place the stylus-support 70 will be moved to the right enough to bring its projection 72 over the cam 157 shown in Fig. 6. It will be evident that when this operation takes place the dollar stylus will be allowed to drop into contact with its cylinder during the third rotation of said cylinder. The dime-support 70 for the stylus is adapted to be engaged by a lever 85, which is connected to a bell-crank lever 86, mounted on a pin 87 on the main frame. The fulcrum of this lever 85 is at the point 88, and is shiftable. If a dime key is operated, the lug thereof will engage lever 86 and thereby rock lever 85 around its fulcrum 88, thereby moving the support 70 to engage the first cam 153 shown in Fig. 6, which will allow the dime stylus to drop into contact with the cylinder during the third rotation of the cylinder. If, however, a dollar key has been also actuated the third rotation will be required for enunciation of the dollar amount, and means are provided for shifting the dime-support 70 an additional distance in such case. The fulcrum 88 for the lever 85 is a pin movable in a slot 88ª, struck from pin 89 as a center. This pin 89 carries a lever 90, bearing pin 88, and a pin 91 on the said lever 90 is adapted to be engaged and moved by a lever 92, also pivoted on pin 89, and the other arm of which is connected through a link 93 to the lever 82 for the dollar bank. When a dollar key is operated, lever 82 is rocked, and this through link 93 rocks lever 90 around its pivot 89, moving the pin 88 in the slot in lever 85. As this slot is, however, struck from pin 89 as a center, no movement of lever 85 takes place, owing to the movement of the lever 84, but the position of fulcrum-pin 88 for lever 85 is thereby changed, so that if a dime key is also operated, instead of the support 70 being moved one step as previously described, a motion of three steps will take place, bringing the support 70 for the dime stylus opposite the third cam 155 shown in Fig. 6. This cam, as shown, will allow the dime stylus to drop into contact with its cylinder during the fourth rotation thereof, and inasmuch as the dollar announcement is made during the third rotation, no interference will result. The support 70 for the penny cylinder is controlled similarly to that of the dime cylinder. A lever 94 is connected by a pin 95 to a bell-crank lever 96, and this lever 96 is adapted to be engaged by the lugs of the penny bank of indicators. Lever 94 has a slot 95ª in which a fulcrum-pin 96ª on a lever 97, pivoted on a pin 98 to the main frame, is adapted to engage, and this slot 95ª is struck from pin 98 as a center, and similar to the slot 88 for the dimes bank. If a penny key is operated, lever 94 will be rocked around its fulcrum-pin 96ª and shift the support 70 for the penny stylus one step. This will bring the support in position to drop during the third rotation of phonograph cylinder, as is evident from the position of the cut-away portion of the first cam 150 shown in Fig. 6 in connection with the cents bank. If, however, a dime key is operated in connection with a penny key, a projection 99 on lever 85 will be moved around pivot 88 as a center, and will thereby depress the rear end of lever 97, as is evident from Fig. 3. Such depression of lever 97 causes pin 96ª to ride up in slot 95ª, thereby changing the fulcrum for the lever 94, so that if a penny key is then operated, the support 70 for the penny reproducer will be moved two spaces to the second cam 151, as shown in Fig. 6, and the announcement of the penny amount will then be made during the fourth rotation of the cylinder. As in this case, the dime announcement is made during the third rotation, no interference will result. If a dollar key is operated in combination with a penny key, the ultimate result will be the same as far as lever 94 is concerned. When a dollar key is operated, as previously stated, lever 82 is rocked around pin 83. This lever has in the lower part thereof a slot 100, in which a pin 101 on a link 102 is adapted to engage. This link is connected to one arm of lever 97, as shown in this figure, and the rocking of lever 84 by the depression of the dollar key will cause the same movement of lever 97 as would a movement of lever 86 from a dime key through its projection 99. With this combination, therefore, the dollar amount would be announced during the third rotation of the cylinder, and the penny amount during the fourth rotation thereof, as will be seen from the position of the depressed part of the second cam 151 in what may be called the "cents row" in Fig. 6. Suppose now that an amount key in each of the banks is operated. The dollar key will produce motion of lever 82, causing the support 70 for the dollars stylus to move one space, and at the same time will cause a movement of pin 88 on lever 90 through link 93 and the bell-crank lever 92.

The cents lever 96 has connected to the short arm thereof a long link 103, which carries at the right-hand end thereof a pin 104, moving in a circular slot 105 in a lever 106, pivoted on the lever 92 at 107. This lever 106 is normally in the position shown in this figure, and such that the pin 104 is in one end of the slot 105. When the cents key is depressed, lever 96 is thereby rocked, and through link 103 rocks lever 106, thereby causing a movement of lever 90 in addition to that produced by the link 93, so that pin 88 on lever 90 is moved to the extreme end of slot $88^a$ in the lever 85. This combined movement is caused by the peculiarly arranged lever 106. This lever, as stated, is pivoted at 107 on the lever 92. Pin $106^a$ engages the walls of a slot $106^b$ in an arm of lever 90. In case of an operation of keys in all three banks, the dollar key will, as stated, rock lever 82 about its pivot 83, moving link 93, which, through lever 92 and pin 91, will rock lever 90. This motion will also cause lever 106 to move, carrying its slot 105 partly past pin 104, inasmuch as pin $106^a$ will make practically a rigid bar of levers 106 and 92. If thereafter a penny bank key is operated, pin 104 will ride to the left end of slot 105 and the further motion of said pin will rock lever 106 around its pivot 107 until pin $106^a$ abuts against the other side of slot $106^b$, and will then rock levers 106 around pin 107 to move lever 90 until pin 88 reaches the extreme end of slot $88^a$, as stated. When the dime lever 86 is then operated the lever 85 will be moved four spaces, so that its support 70 will then be in position to coöperate with the fourth cam 156 shown on Fig. 6. This cam, as will be seen, brings its stylus into contact with the dime cylinder during the fourth rotation of the cylinder, but causes it to be withdrawn before the rotation is completed. In this case the word "cents" will not be enunciated. As previously described, the operation of the dollar lever 84 through link 102 rocks lever 97 and moves the pivot-pin $96^a$ in the slot $95^a$. The operation of the dime lever 86 will rock the lever 85 around the pivot 88, which has been moved in its slot by the operation of lever 84, but inasmuch as its pin has been moved, the fulcrum of lever 85 is much nearer the point of application of force than in the prior example, so that the projection 99 operates to a greater extent than previously, and causes a greater movement of lever 97. It results from this that when lever 96 is operated by the "cents" key, its lever 94 will be rocked to a greater extent than previously, and will move the support 70 for the penny stylus to the third cam 152, shown in the cents row. This cam, as will be seen, allows the penny stylus to drop into contact with its cylinder during the fifth rotation of the cylinder, so that the indication will be as follows: The dollar amount will be announced during the third rotation, as will be seen from the position of its cam 157. The announcement of the dime amount will be controlled by the fourth cam 156, and will therefore come to operation during the fourth rotation, but will not include the word "cents" and the cents announcement will be given during the fifth rotation. It will now be seen as was previously stated that although the keys from twenty to ninety cents will cause a movement of the penny cylinder 47 that the penny disk 73 will nevertheless prevent an annunciation from this cylinder when the cylinders all rotate.

From the foregoing description, it will be seen that in case no key is operated in some particular bank, the reproducer for that bank will be maintained out of operation, and that reproducers for the banks which are operated will be brought into operation successively, and without interval there between. The special transaction cylinder is controlled as to reproduction in the same manner as are the amount cylinders; that is, there is a reproducer therefor, arranged to be allowed to drop into contact with the cylinder by a cam 158, shown at the left of Fig. 6, and this cam will in all cases cause an announcement of the transaction during the second revolution of the cylinder, no change as to time of operation being required in regard to this announcement.

Figure 2:
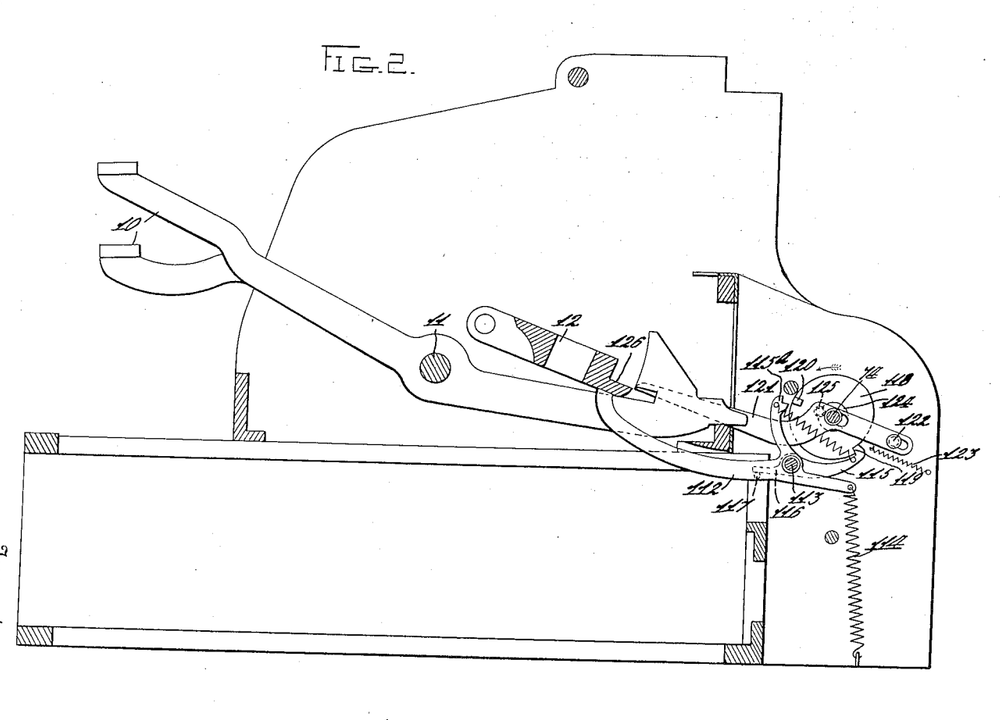
Fig. 2 is a similar section with parts broken away, showing the locking device for the phonograph cylinders.

There are provided means for preventing the operation of the phonograph until the amount keys have returned to normal position, and for then locking said keys in such normal position until the operation of the phonographs is completed. This means, therefore, provides for successive operation of the key mechanism and the phonograph mechanism, and allows time for the operation of the phonographs before another operation of the keys can be made. This mechanism is shown in Fig. 2, and comprises a lever 112, pivoted on a pin 113 on the main frame, one end of the said lever being adapted to engage the key-coupler when the coupler reaches its lowest position. The lever 112 is normally drawn by a spring 114 into the position shown in this figure, and on the pivot 113 for the said lever is journaled an escapement device 115, having a forwardly projecting portion 116, adapted to be engaged and moved by a pin 117 on the lever 112. A disk 118 is mounted on the shaft 74, which carries the cams for the phonographs, and this shaft is normally retained locked by engagement of one of the escapement pallets with a notch 119 on said disk. Nearly opposite the notch 119 is a lug 120, also mounted on the disk 118 in position to be engaged by a very slight movement of the disk with another pallet 115ª, integral with lever 112. When the coupler is raised by an operation of the keys, the lever 112 will be rocked around its pivot 113 by the spring 114. In this case the pin 117 will contact projection 116 of the escapement 115 and rock the same. Notch 119 will thereby be released from the escapement, and the disk 118 will move slightly, or until lug 120 engages the other escapement pallet. The shaft 74 will remain in this slightly advanced position until the return of the coupler to its normal position, when the escapement will rock back to its former position, releasing the disk 118. This disk will then make nearly a complete revolution until the projection 119 again engages, as shown, with the escapement pallet.

To provide for locking the operating mechanism of the register until the phonograph finishes its operation, there is a sliding-bar 121, mounted on the shaft 74, and on a pin 122. The bar 121 is provided with elongated slots, through which the shaft 74 and pin 122 are adapted to pass. The bar 121 is normally drawn rearward by a spring 123, and is adapted to be moved forward by a cam 124 carried on shaft 74. It is evident from this structure that when shaft 74 is released and begins to rotate, the cam 124 will engage an anti-friction roller 125, carried by bar 121 and throw the said bar forward. The extreme forward end of the bar will then pass over the projecting lug 126 of the coupler and lock the same until the shaft 74 completes its rotation and returns to normal position. The spring 123 will then withdraw the bar 121 to the position shown in this figure, and the keys will again be unlocked.

Figure 8:
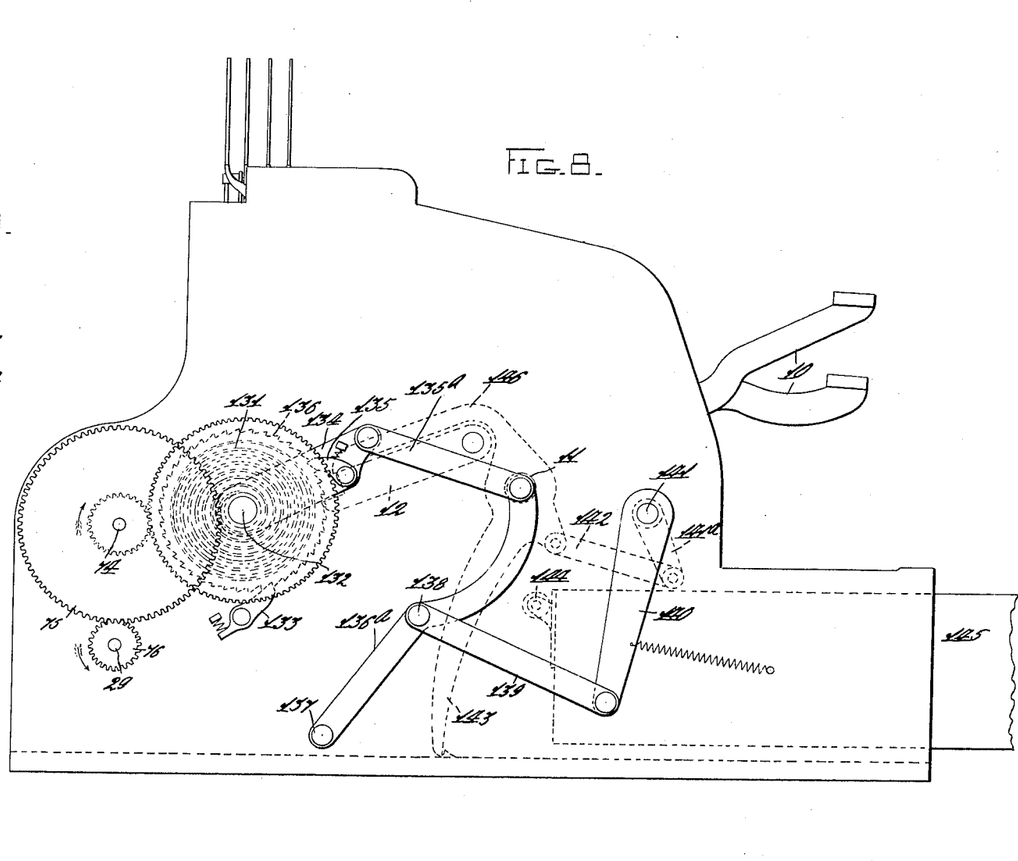
Fig. 8 is a transverse section of the machine looking in the opposite direction from Figs. 2 and 3, showing the spring-motor for the phonograph and the winding device therefor.

The phonograph mechanism may of course be run by any well-known motor, but it is shown as adapted to be controlled by a spring-motor, which is automatically wound up at each operation of the machine. The mechanism is best shown in Fig. 8, and by reference to this figure it will be seen that there is provided a spring-barrel 131, mounted on a shaft 132, and normally prevented from reverse rotation by a retaining pawl 133. The shaft 132 has also journaled thereon an actuating lever 134, carrying a pawl 135, adapted to engage ratchet-teeth 136 of the spring-barrel 131. This lever 134 is connected by a link 135ª to a lever 136ª journaled on a pin 137 on the main frame. Near the center of this lever 136 is a pin 138 which has fastened thereto a link 139 connected at its other end to a lever 140, journaled on a pin 141, the pin being also mounted on the frame of the machine. The lever 140 has rigidly connected therewith a short arm 141ª, which is connected by a link 142 to a lever 143 journaled on the shaft 11, which supports the amount keys. The lever 143 is adapted to be engaged and moved by a roller 144, carried on the rear of the cash-drawer 145.

Figure 9:
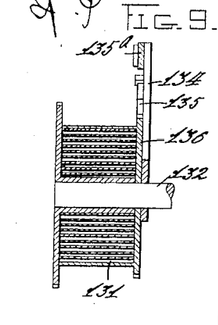
Fig. 9 is a section through the operating spring for the motor.

In Fig. 8 the cash-drawer is shown in its outward position, and when it is returned to normal position the roller 144 will engage the curved side of lever 143, rocking the same around its pivot 11. This lever mechanism previously described will rock the winding mechanism an amount equal to that by which it had run down at its previous operation. Inasmuch, however, as the cash drawer is not always closed after operations of the machine, and inasmuch as in such cases the spring might become too weak to perform the function of operating the phonograph, there are provided alternate means for oscillating the lever 143. The said lever 143 has extending upwardly from its pivot a part 146 adapted to overlie the key-coupler 12, as shown in Fig. 8. As will be evident from this figure, when the amount keys are depressed, if the cash-drawer is allowed to remain open the depression of the amount keys will raise the key-coupler, and thereby rock the part 146 of the lever 143, and so will rewind the phonograph spring, producing an effect equivalent to that of closing the cash-drawer. This mechanism controlled by the key-coupler is also shown in Fig. 1 in the normal position of the device. Here the cash-drawer 145 has been closed, carrying the lever 143 to its usual position, and rocking the short arm 141 of lever 140. In Fig. 9 an operating spring for the phonograph is shown in cross section.

Figure 7:
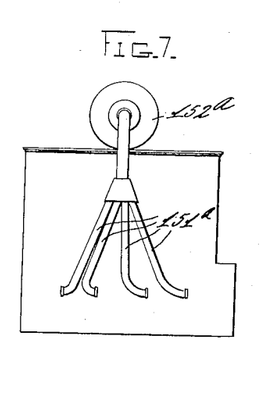
Fig. 7 is a view of the phonograph horn.

Fig. 7 illustrates one means of connecting the sound tubes of the various phonograph cylinders to a common horn, and this will be easily understood from the figure in which 151ª indicates the various tubes and 152ª the horn. The operation of this device will be as follows: No motions of the operator, other than those required by the usual registration of amounts in the register, are required. The keys 10 are slightly depressed, and thereby coupled to the key-coupler, when a depression of any one of the actuated keys will cause a complete operation of all. During the downward stroke of the keys, the phonograph cylinders are slid horizontally to a position in which the styli will engage the proper records. This depression of the amount keys also moves the stylus-supports laterally to bring them in contact with the proper cams. When the keys are released and returned to normal position, the phonograph mechanism is then released and allowed to operate the cylinders, the styli being meanwhile retained in position, inasmuch as the indicator lugs which perform the setting are adapted to remain in raised position between the operations of the machine.

It will be supposed that an operation of the machine to register and announce a sale of $2.54 is desired. The depression of the two-dollar key will raise the lug 14 of the corresponding indicator until it engages and moves the lever 15, and through the link connection shown in Fig. 4 moves the cylinder 30 two spaces to the right. The fifty-cent key will raise the lug 14 on its indicator until it engages with lever 16 and with lever 45. Lever 16 through its link connections will move cylinder 36 five spaces to the right, and through its engagement with lever 45 will move the penny cylinder 47 a distance to the right previously referred to by the term 2X. The four-cent key will through its indicator lug 14 rock the lever 17, thereby causing the cylinder 47 to move a farther distance to the right equivalent to 8X. At the same time the indicator lugs will have engaged and moved the system of levers shown in Fig. 3. The two-dollar indicator lug 14 will rock the lever 84 and cause the support 70 for the dollar stylus to move to the right in this figure, so as to bring the cam 157, shown in the dollars row in Fig. 6, into position to allow depression of the dollar reproducer during the third rotation of the cylinder. This movement of lever 84 will also through its connection with lever 90, through link 93, move the pivot pin 88 in the cam slot in the tens lever 85. When the fifty-cent key is depressed the lever 86 will be rocked, and this will carry the support 70 for the dime reproducer three spaces to the right, bringing the third cam 155, shown in the dimes row, into position to coact with the cylinder. It is to be noted, also, that the depression of the dollar and dimes key will rock the lever 97 around its pivot 98 by means of the link 102, connecting said lever 97 with the dollar lever 82, and also by means of the projection 99 on the dimes lever 85 engaging said lever 97. The pivot-pin 96ª is thereby raised nearly to the top of cam-slot 95ª, so that when the aforesaid key is depressed the penny lever 94 will be moved three spaces, or until the support 70 for the penny reproducer is adapted to engage the third cam 151, shown in the cents row in Fig. 6. This depression of the four-cent key will also, through link 103 connected with lever 96, rock the lever 106, and through this will raise the lever 90 to the extreme upper end of the slot in which pivot-pin 88 rides. This further movement of the pivot-pin 88 will rock lever 85 around the top end thereof as a fulcrum, and will carry the dime reproducer support 70 one additional space, or until the fourth cam 156 of the dime row is adapted to engage therewith.

When the amount keys are allowed to return to normal position, the coupler will engage and operate the lever 112, shown in Fig. 2, and release the shaft 74, allowing it to make one complete revolution. As previously stated, the phonograph cylinder shaft 29 has a five to one ratio of gearing to the shaft 74, and during the first rotation of the cylinders no reproducer is allowed to drop into contact with any cylinder. During the second rotation the special transaction reproducer, if the key has been depressed, will cause an announcement of its record. The dollar reproducer has been set in line with the cam 57 shown in the dollar row, and will therefore be allowed to drop into contact with its cylinder during the third rotation of the cylinder shaft. The dime reproducer, as described, is moved to engage with the fourth cam 155 shown in Fig. 6, and will thereby be allowed to drop into engagement with its cylinder during the fourth rotation thereof, but for only part of that revolution, due to the cut-away nature of the fourth cam. The penny reproducer has been moved until its support is in position to engage the third cam 152 shown in the cents row in Fig. 6, and its announcement will therefore be made during the fifth rotation of the cylinder. The announcement of the amount will therefore be given in order, and the word "cents" will not be announced after the word "fifty," but will be announced after the word "four." If a sale is made which does not necessitate the use of a key in each bank, the system of levers shown in Figs. 3 and 4 will in each case provide for the motion of the cylinders and reproducers to give what has been termed a "commercial announcement" of the amount.

It will of course be understood that the styli and cylinders will not return to normal position until a succeeding operation of the machine, as they are controlled by the indicator lugs 14. The indicators remain set between operations, and will hold the phonograph mechanism in set position also.

It will be noted that no plain disk is shown in connection with the special transaction stylus (see Figs. 3 and 6). The cam 158 in Fig. 6 will therefore allow this stylus to drop at each operation of the machine, but the transaction cylinder is normally entirely out of register with the stylus (see Fig. 3), so that unless this cylinder has been slid laterally by the depression of a transaction key, no contact will result when the stylus is depressed.

While the form of mechanism here shown and described is admirably adapted to fulfil the objects primarily stated, it is to be understood that it is not intended to confine the invention to the one form of embodiment herein disclosed, for it is susceptible of embodiment in various forms all coming within the scope of the claims which follow.

Alining devices for the phonograph mechanisms may be employed if desired to insure an accurate positioning of the cylinders.

What is claimed is as follows:

1. In a cash register, the combination with an operating mechanism and a series of phonographic mechanisms controlled thereby, of means for permitting enunciation from said mechanisms in a predetermined order of succession and means for preventing an interval between any two of such enunciations normally out of immediate succession when an intermediate mechanism is to remain out of action.

2. In a cash register, the combination with an operating mechanism and a series of phonographic mechanisms controlled thereby, one for each denomination, of a series of keys for setting said mechanisms, divided into banks, means for releasing said mechanisms in a succession from the highest denomination to the lowest, and means preventing an interval between the operation of two mechanisms normally out of immediate succession, when an intermediate mechanism remains inactive.

3. In a cash register, the combination with an operating mechanism, of a series of phonographic mechanisms controlled thereby, a bank of keys for each phonographic mechanism and determining the enunciation thereof, means for releasing the phonographic mechanisms in an order corresponding to the order of the banks of keys, and means preventing an interval before the enunciation for a following bank when no key in a preceding bank has been operated.

4. In a cash register, the combination with an operating mechanism, and a series of phonographic mechanisms controlled thereby, keys in banks for determining the enunciation of the phonographic mechanism, cams for each phonographic mechanism controlling the operation, and means for changing the operative connection from one cam to another.

5. In a cash register the combination with an operating mechanism, of a phonographic record and reproducer controlled thereby, manipulative means for determining the relative position of the record and reproducer, a shaft having a series of cams thereon, said cams having depressions at different peripheral points and means holding any one of said phonographic record and reproducer apart and adapted to be moved by said cams.

6. In a cash register the combination with a phonographic record, and keys for setting same to position, of a reproducer normally held from contact with said record, a shaft having cams mounted thereon having depressions at different peripheral points, and means holding said reproducer and adapted to rest on any one of said cams.

7. In a cash register, the combination with a phonographic mechanism having records in one denomination, of two banks of keys of different denominations and means for setting the mechanism from either or both banks of keys.

8. In a cash register, the combination with a phonographic mechanism having records in one denomination of manipulative elements for two denominations, means for setting the mechanism a constant amount from the manipulative elements of one denomination and means for setting the mechanism differentially from the manipulative elements of the other denomination.

9. In a cash register, the combination with a phonographic mechanism, of two banks of keys operatively connected thereto, means for setting said mechanism a constant distance when any key of one bank is depressed and for setting said mechanism differentially from the keys in the other bank, said means capable of separate or conjoint action, and each producing its full effect.

10. In a cash register, the combination with a phonographic mechanism having two records of one value, of a key for that value and connections for setting the mechanism to one of the records, a second key and means controlled thereby for operating the connection to set the mechanism at the other record when the two keys are operated together.

11. In a cash register, the combination with a movable phonographic mechanism having two sets of records, of two banks of keys, means operated by any key in one bank for setting the mechanism to such position that one set of records will be utilized and means operated by any key in the other bank to set the mechanism in position to utilize the other set of records, when two keys in different banks are operated in conjunction.

12. In a cash register, the combination with a settable phonographic mechanism, of keys for controlling same, including a one cent key, means operated by said one cent key alone for setting the mechanism to enunciate the corresponding amount, said keys also including a higher value key for setting the mechanism, and means controlled by the higher key in conjunction with said one cent key for causing the mechanism to be set so as to vary the words enunciated.

13. In a cash register, the combination with a phonographic mechanism including a plurality of records, of reproducers, one for each record, manipulative elements for setting said records relatively to said reproducers, means for successively permitting a contact between the reproducers and corresponding records, and means preventing a complete enunciation from one record when a following record is to be used.

14. In a cash register, the combination with a plurality of phonographic records, one for each denomination, of means for causing the records thereon to be reproduced in predetermined succession and means for permitting a complete enunciation from one record only when a succeeding record is not to be used.

15. In a cash register, the combination with a phonographic mechanism comprising a record for dimes and a record for cents, of two banks of keys respectively controlling said records and means permitting a complete enunciation corresponding to a key in one bank only when no key in the other bank is operated.

16. In a cash register, the combination with a phonographic mechanism having a plurality of independent records thereon, each record consisting of more than one word, of two groups of manipulative devices, one of which groups controls said phonographic mechanism, and means controlled by the other group of manipulative devices for preventing enunciation of all of said words.

17. In a cash register, the combination with a phonographic mechanism having a set of records for one denomination spaced apart and a set of records alternated between the spaced records, of a reproducer common to both sets of records, and two series of keys one of which moves the mechanism to use one set of records and both of which when operated together move the alternate set of records into operative position.

18. In a cash register, the combination with a phonographic mechanism including a plurality of records, manipulative elements for controlling each record separately, a plurality of reproducers normally out of contact with the records, a common operating means permitting such contact and means to prevent a contact except when a record is in position to be operated.

19. In a cash register, the combination with a phonographic mechanism, and a reproducer therefor, of a bank of keys, a series of cams for controlling the reproducer and means operated by the keys for moving the reproducer to position to coact with different cams.

20. In a cash register, the combination with an operating mechanism, of a phonograph mechanism controlled thereby, having a plurality of records, a reproducer for each record, a bank of keys for setting each record, cams for permitting contact between each record and its reproducer and means for changing the control of the reproducer from one cam to another.

21. In a cash register, the combination with a phonographic record and a reproducer therefor normally out of contact therewith, a bank of keys for setting said record, cams for permitting contact between said reproducer and said records, and a second bank of keys and connections which when operated changes control of said contact from one cam to another.

22. In a cash register, the combination with a phonographic record and a reproducer therefor, of a bank of keys controlling said record, a shaft having a plurality of cams for permitting contact between said reproducer and record at different parts of the rotation of the shaft, means operated by said bank of keys for placing the reproducer under the control of one cam a second bank of keys and means operated by said second bank for changing the control to a second cam.

23. In a cash register, the combination with keys, and a phonographic mechanism having denominational records and controlled in position by said keys, a reproducer for each denomination, and means for preventing engagement between said reproducers and records, with connections whereby operation of said keys renders said preventing means ineffective.

24. In a cash register, the combination with a phonographic record and a reproducer therefor, with devices normally holding said reproducer out of operative relation with said record, a manipulative device for setting said record, and means controlled by said manipulative device for disabling said holding devices.

25. In a cash register, the combination with a plurality of phonographic records and a bank of setting keys for each, means for reproducing the records in succession with a predetermined interval of time and means for maintaining the interval when keys in less than all the banks are operated.

26. In a cash register, the combination with denominational manipulative devices, of denominational phonographic records set thereby, reproducers for said records with devices normally preventing actuation of said reproducers, connections controlled by one of the manipulative devices for permitting actuation of a reproducer, with means controlled by another manipulative device for determining the time relative to the whole operation when said connections become effective.

27. In a cash register, the combination with a phonographic record and a reproducer therefor, of a movable device having a plurality of differently positioned means for controlling the time of operation of the reproducer relative to a complete operation of the machine, and a plurality of manipulative devices of different denominations for predetermining which controlling means shall be effective.

28. In a cash register, the combination with banks of keys, of phonographic records controlled thereby, reproducers, one for each record, means permitting contact of the reproducers and records successively, and means controlled by any bank of operated keys and all banks of operated keys of higher order for determining the relative period of the operation during which the said contact with the record for the first mentioned bank of keys shall be permitted.

29. In a cash register, the combination with manipulative devices of different denominations, of enunciating means one for each denomination of the manipulative devices, and differentially adjustable, means permitting enunciation by said means successively in order of denominations, and devices controlled by any operated manipulative device and all operated manipulative devices of higher denomination for determining the relative period of the operation during which the enunciation for the first mentioned manipulative device shall be permitted.

30. In a cash register, the combination with an operating mechanism, and a series of enunciating devices controlled thereby, of means permitting successive enunciation by said devices at a predetermined rate of succession, and means for changing the rate of succession of enunciation when less than all the enunciating devices are employed.

31. In a cash register, the combination with an operating mechanism, of enunciating devices of different denominations controlled thereby, means for permitting enunciation from said devices successively at a predetermined rate of succession, and means for changing that rate of succession, said means being dependent on less than all the devices being permitted to operate.

32. In a cash register, the combination with an operating mechanism, enunciating devices of different denominations controlled thereby, and means permitting said enunciating devices to operate, said means being constructed to permit operation of any device at a constant period of the actuation of said operating mechanism if no other enunciating device is used, but to delay operation of enunciating devices of lower denominations when devices of higher denominations are also employed.

33. In a cash register, the combination with an operating mechanism, and enunciating devices for different denominations controlled thereby, of means permitting said enunciating device to operate, said means being constructed to permit an operation of any enunciating device at a constant period of the actuation of said operating mechanism when no other enunciating device is used, but to change the time of operation of enunciating devices of certain denominations when other enunciating devices are also employed.

34. In a cash register, the combination with an enunciating device, of two keys, means for adjusting said device controlled by said keys, and means for producing different adjustments depending on whether one or both keys are actuated.

35. In a cash register, the combination with enunciating devices, of manipulative devices of different denominations for causing differential adjustment of one enunciating device, and connections whereby a manipulative device in each of two denominations may be actuated to cause a manipulative adjustment of said enunciating device.

36. In a cash register, the combination with enunciating devices, of manipulative devices of different denominations for causing differential adjustment of said enunciating devices, means for permitting successive enunciation by said devices at a predetermined rate of succession, and means for hastening the rate of succession when less than all the enunciating devices are employed.

37. In a cash register, the combination with a plurality of phonographic mechanisms, and a reproducer for each mechanism, of banks of keys controlling enunciation from said mechanisms, cams having differently spaced parts for permitting engagement of said phonographic mechanisms and said reproducers, and devices actuated by keys in higher order banks for changing control of the engagement between the phonographic mechanism and the reproducer of a lower order from one cam to another.

38. In a cash register, the combination with a plurality of phonographic mechanisms, and reproducers therefor, of banks of keys, cams having differently timed parts for controlling engagement between said phonographic mechanisms and said reproducers, and means actuated by keys in higher order banks for differentially shifting control of the engagement between said phonographic mechanism and said reproducer of a lower order to differently timed cams.

39. In a cash register, the combination with a plurality of phonographic mechanisms and reproducers therefor, means including bearing arms for permitting engagement of said phonographic mechanisms with said reproducers, of a plurality of differently timed cams for actuating said bearing arms, banks of keys, and mechanism controlled by keys in higher order banks for shifting the bearing arm of a lower order to engagement with the cams.

40. In a cash register, the combination with phonographic mechanisms and reproducers therefor, of bearing arms permitting engagement of said phonographic mechanisms with said reproducers, a plurality of differently timed cams controlling said bearing arms, banks of keys, levers actuated by said banks of keys with connections whereby said levers shift said bearing arms, and means controlled by keys of higher order banks for differentially shifting the fulcrums of levers of lower orders.

41. In a cash register, the combination with two groups of manipulative devices, of a phonographic record, and means controlled by devices of either group when independently operated for imparting different movements to said record, the said means being constructed to impart to said record the sum of movement of the manipulative devices when they are jointly operated.

42. In a cash register, the combination with two groups of operating devices therefor, of a phonographic record, a reproducer for the latter and means controlled by devices of either group when independently operated for producing a variable relative movement between the record and the reproducer, the said means being constructed to produce a relative movement between the record and reproducer when devices of both groups are jointly operated equal to the sum of movement produced by the independent operations of devices of both groups.

43. In a cash register, the combination with a plurality of groups of manipulative devices, of a plurality of phonographic couples, each comprising a record and a reproducer, one couple for each group of manipulative devices, means for operating all couples in successive order when a manipulative device of each group is operated, and means for cutting out the interval in the operation of the remaining couples that ordinarily would elapse, if a manipulative device of an intermediate group is not operated.

44. In a cash register, the combination with three groups of manipulative devices representing dollars, dimes and cents, of corresponding phonographic couples controlled by said manipulative devices, a plurality of differently timed cams controlling the operation of the cents phonographic couple, and means controlled by the different groups of manipulative devices for bringing the cents couple under the control of the different cams.

45. In a cash register, the combination with three groups of manipulative devices representing dollars, dimes and cents, of corresponding phonographic couples controlled by said manipulative devices, a plurality of differently timed cams for controlling each of the cents and dimes phonographic couples and means controlled by the different groups of manipulative devices for bringing the cents and dimes couples under the control of the different cams so as to enunciate properly the amount represented by the operated manipulative devices.

In testimony whereof I affix my signature in the presence of two witnesses.

FRANCIS K. FASSETT.

Witnesses:
 Roy C. Glass,
 Carl J. Beust.

---

It is hereby certified that in Letters Patent No. 965,509, granted July 26, 1910, upon the application of Francis K. Fassett, of Dayton, Ohio, for an improvement in "Cash-Registers," an error appears in the printed specification requiring correction as follows: Page 9, line 75, the words "any one of" should be stricken out and inserted before the word "said," line 77, same page; and that the said Letters Patent should be read with this correction therein that the same may conform to the record of the case in the Patent Office.

Signed and sealed this 18th day of October, A. D., 1910.

[SEAL.]

E. B. MOORE,

*Commissioner of Patents.*